Aug. 31, 1965     H. H. BANKS     3,203,399
ANIMAL-RUN DEVICE
Filed May 8, 1964     2 Sheets-Sheet 1
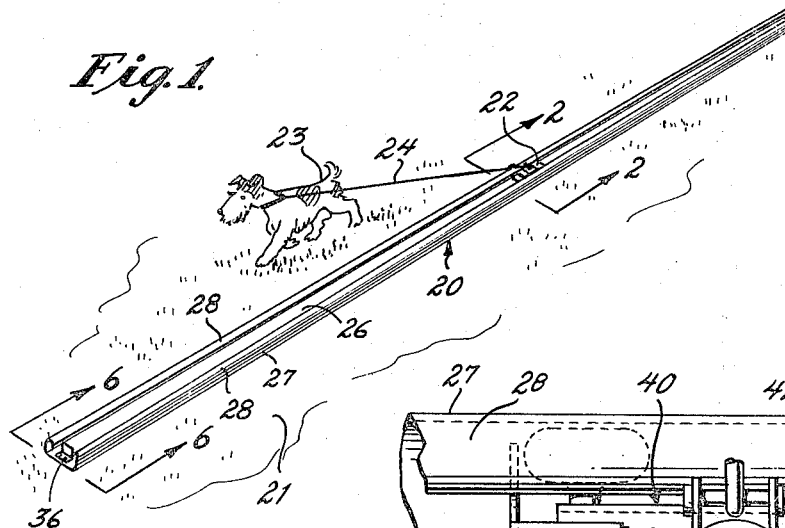
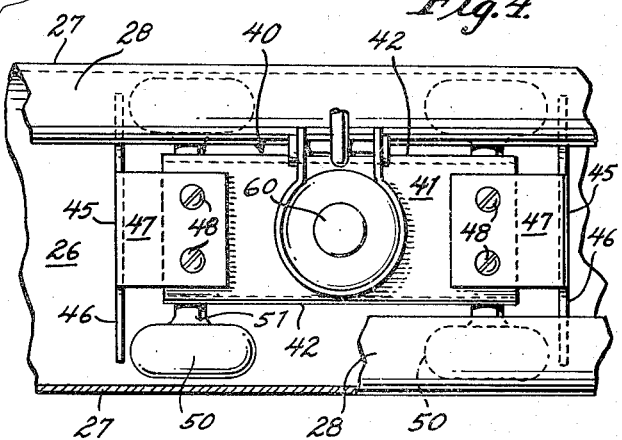
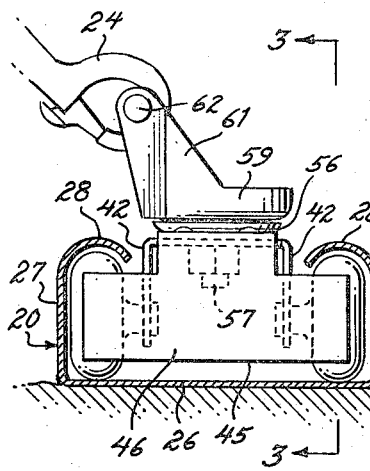
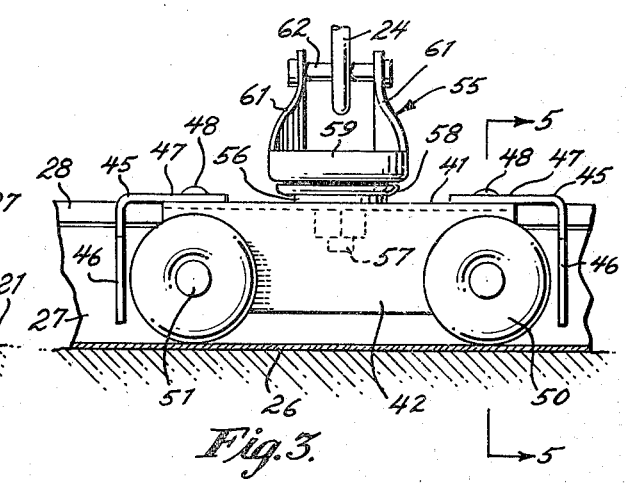
INVENTOR.
HARRY H. BANKS
BY Robert K. Youtie
ATTORNEY

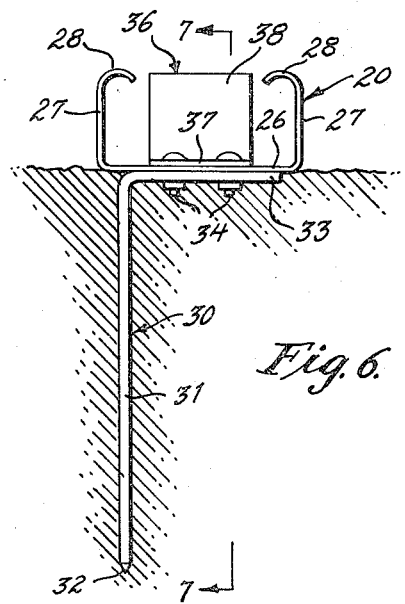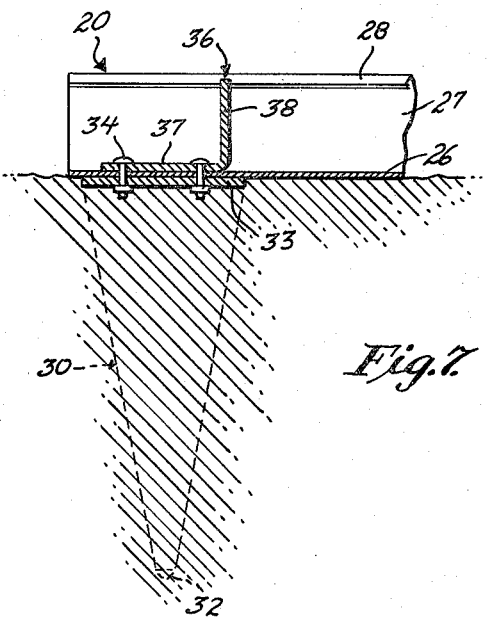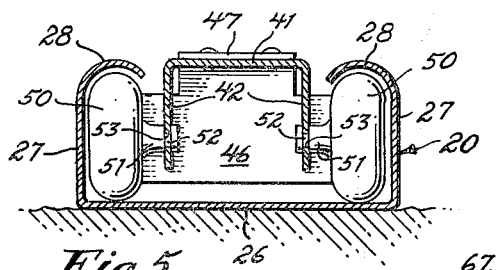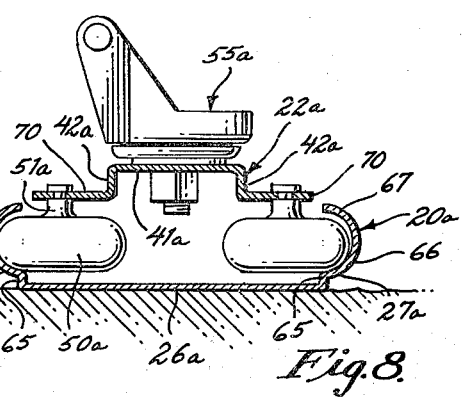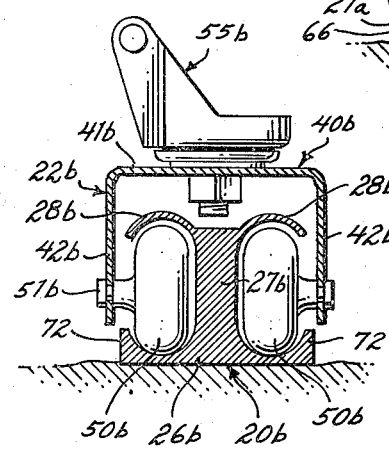

United States Patent Office 3,203,399
Patented Aug. 31, 1965

3,203,399
ANIMAL-RUN DEVICE
Harry H. Banks, 8825 Roosevelt Bldg., Philadelphia, Pa.
Filed May 8, 1964, Ser. No. 366,060
7 Claims. (Cl. 119—120)

This invention relates to run devices for animals, and is especially concerned with an animal run of a type having a carriage movable along a track.

It is an important object of the present invention to provide an animal-run device of the type described which affords maximum freedom of movement to an animal with complete safety, is capable of arrangement in any desired configuration according to available space, and is durable and reliable throughout a long useful life.

It is a further object of the present invention to provide an animal-run device having the advantageous characteristics mentioned in the preceding paragraph, which is extremely simple in construction, adapted to be easily set up and installed, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a top perspective view showing an animal-run device of the present invention in operative condition of use;

FIGURE 2 is a transverse sectional view taken generally along the line 2—2 of FIGURE 1, and enlarged for clarity of understanding;

FIGURE 3 is a longitudinal sectional elevational view taken generally along the line 3—3 of FIGURE 2;

FIGURE 4 is a top plan view of the device of FIGURE 3, with parts broken away for clarity;

FIGURE 5 is a transverse sectional view taken generally along the line 5—5 of FIGURE 3;

FIGURE 6 is a sectional elevational view taken generally along the line 6—6 of FIGURE 1;

FIGURE 7 is a longitudinal sectional elevational view taken generally along the line 7—7 of FIGURE 6;

FIGURE 8 is a transverse sectional view similar to FIGURE 2, but showing a slightly modified embodiment of the present invention; and FIGURE 9 is a transverse sectional view similar to FIGURE 2, but showing still another slightly modified embodiment of the present invention.

Referring now more particularly to the drawings, and specifically to FIGURES 1–7 thereof, a track is there generally designated 20 and is shown in position extending along a ground surface 21. While the track is illustrated as generally straight, it is appreciated that the track may be formed of arcuate or curved sections, as required, to accommodate to any desired configuration of available space.

Freely movable along the track 20 between opposite ends thereof is a carriage 22, to which an animal 23 may be tethered by a line 24.

The track 20 may include a generally flat bottom plate or bed 26 adapted to rest on the ground surface 21. Upstanding from opposite longitudinal side edges of the track bed or bottom wall 26 are a pair of laterally spaced side walls or rails 27. Extending along the upper edge of each side wall or rail 27 may be an inturned flange or overhang 28. The flanges or overhangs 28 may be of transversely arcuate, downwardly concave configurations spaced over and facing downward toward the track bed 26. If desired, the track 20 may be integrally fabricated of any suitable material, say of extruded aluminum, or otherwise, if desired.

Securing the track 20 in position on the ground surface 21 may be a plurality of ground-impaling elements or anchors 30, see FIGURES 6 and 7. The anchors 30 may each include a downwardly tapering plate portion 31, preferably terminating at its lower end in an impaling point 32. Extending transversely from the upper end of plate 31 may be provided a securement plate or flange 33 secured in facing engagement with the underside of track bed 26, as by suitable fasteners 34. The anchoring elements 30 may be located at intervals spaced along the track 20, the illustrated anchoring element being adjacent to the track end.

Also at the track end region may be provided an upstanding stop member or bumper 36. The stop member 36 may include a generally horizontal plate portion 37 seated on the upper surface of track bed 26 spaced medially between the side rails 27. The stop-member plate portion 37 may be fixedly secured in position by any suitable fastener means, such as the fasteners 34. Upstanding from the plate portion 37, inward thereof longitudinally of the track 20, is a plate portion 38 for limiting abutment with the carriage 22. By this means, the carriage 22 is freely movable along the track 20 and may not be inadvertently removed endwise therefrom.

The carriage 22 may include a body or chassis 40 composed of an inverted channel having a top wall 41 and longitudinally extending, depending side walls 42. The top wall 41 may be generally horizontal and extend longitudinally along and spaced over the track bed 26 between the overhangs 28. The side walls 42 also extend longitudinally along the track 20, in laterally spaced facing parallelism with each other and depend between the opposite side rails 27 and overhangs 28. At opposite ends of the inverted channel member 41, 42 may be provided carriage end members 45 in the nature of bumpers or cowcatchers. Each carriage end member 45 includes a generally vertical plate portion 46 extending laterally of the track 20 across and beyond the channel 41, 42 and having its opposite end portions beneath respective overhangs 28. A securement plate 47 extends from the upper edge of each plate 46 into overlying relation with the adjacent end portion of channel plate 41, to which it may be secured by suitable fastener means 48.

The carriage body 40 described above is supported in spaced relation within the track 20 by rollable wheel means on opposite sides of the body beneath the overhangs 28. The wheel means may include a pair of wheels 50 on each side of the carriage body 40 and freely rotatably supported, as by journal means or axles 51 extending horizontally through the adjacent carriage-body side wall 42. In the illustrated embodiment, the wheels 50 on each side of the carriage body 40 are in respective coaxial alignment with the wheels on the other side of the carriage body, so as to define a rectangular wheel arrangement. Further, the wheels 50 are each located in the space between the track bed 26 and an overhang 28, for rolling engagement therewith and retention thereby. Thus, the wheels 50 serve to retain the carriage 22 in its position on the track 20 while permitting of free movement therealong. As the wheels 50 are located longitudinally inward of the carriage endplates 46, and as the latter extend at least partially across the wheels, the endplates may serve to effectively retain foreign matter away from the wheels.

The wheel axis 51 may be fixed relative to the wheels 50 and be provided with reduced portions 52 extending through and rotatably journaled in openings 53 of the carriage-body side walls 42. If desired, axially aligned wheels 50 may be connected together or journaled on a single axle.

Carried on the carriage-body top wall 41 may be a tether connection 55, advantageously of a swivel type. The tether connection may include a base 56 seated on the carriage top wall 41 and fixed thereto, as by fastener means 57. On the upper side of the base 56 may be a ball race 58, on which is seated the generally flat underside of a swivel element 59. A pivot 60 extends through the swivel element 59 and may be integral with the fastening means 57 to secure the swivel element in position and permit free rotation thereof about the vertical pivot axis. Shackle arms 61 may extend upward from the swivel element 59, between which extends a pin or rod 62 for securement to the animal tether 24. The arms 61 extend upward eccentrically with respect to pivot 60, so that pin 62 is located transversely of and spaced from the axis of pin 60. Thus, force on the tether 24 serves to freely rotate the swivel member 59 and keep the tether untangled.

A slightly modified embodiment is shown in FIGURE 8, a track there being generally designated 20a and having a carriage 22a freely movable along the track.

The track 20a includes a generally flat, horizontally extending bottom wall or bed 26a and upstanding side walls or rails 27a along opposite longitudinal edges of the bed.

Each rail 27a may include a lower portion 65 upstanding from the adjacent side edge of bed 26a, an arcuate portion 66 curving outwardly and upwardly from the upper edge of lower portion 65, and an upper portion or overhang 67 curving upwardly and inwardly over the rail portion 66. Viewed otherwise, the rail portion 66 and overhang 67 may be considered as of arcuate, generally semi-circular transverse configuration facing inwardly of the track 20a.

The carriage 22a may include a body having a longitudinally extending top wall 41a spaced laterally intermediate the rails 27a and having longitudinally extending, depending side walls 42a. Extending longitudinally along and laterally outward from the lower edges of side walls 42a are generally horizontal, side-wall flanges 70. The flanges 70 may each carry a pair of wheels 50a depending below the respective flange and carried thereby for rotation about generally vertical axes. That is, the wheels 50a are disposed generally horizontally and beneath respective flanges 70, having axles 51a upstanding through and freely rotatably journaled in the flanges.

The wheels 50a are thus rollably engaged in respectively adjacent track rails 27a to mount the carriage 22a for free movement along the track; and, the wheels are located beneath and retained in position by the rail overhangs 67.

A swivel connection 55a may be carried by the carriage top wall 41a in the same manner as the swivel connection 55 of the first-described embodiment.

In the modification of FIGURE 9 is shown a track generally designated 20b and a carriage 22b mounted for free movement along the track.

The track 20b may include a bottom wall or bed 26b having a pair of upstanding side flanges 72 along respective longitudinal edges of the bed. Spaced laterally intermediate the side flanges 22b is an upstanding track rail 27b, and extending laterally in opposite directions from the upper region of the track rail are a pair of arcuate flanges or overhangs 28b respectively spaced over the track bed 26b on opposite sides of the rail 27b.

If desired, the track bed 26b on opposite sides of the rail 27b may have its upper surfaces of transversely arcuate, concave configuration; and, the rail flanges 28b may each be of transversely arcuate, downwardly concave configuration.

The carriage 22b may include a generally channel-shaped, downwardly facing body 40b having a longitudinally extending top wall 41b disposed over the overhangs 28b, and a pair of depending side walls 42b on opposite sides of the track 20b. Rotatably carried by each of the body side walls 42b, inward thereof, may be a pair of generally vertical wheels 50b located on the track bed 26b and beneath respective overhangs 28b. The wheels 50b may be provided with generally horizontal, outwardly projecting axles 51b respectively journaled in adjacent carriage-body side walls 42b.

By this construction, and as is apparent from FIGURE 9, the wheels 50b are effectively retained in position between the track bed 26b and overhangs 28b, on opposite sides of the track rail 27b, while permitting of free carriage movement along the track.

Carried by the carriage-body top wall 41b may be a swivel connection 55b similar to the swivel connection 55 of the first-described embodiment for securement to an animal tether.

From the foregoing, it is seen that the present invention provides an animal-run device which fully accomplishes its intended objects and is well adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

What is claimed is:

1. An animal-run device comprising an elongate bed adapted to extend along a ground surface, anchoring means for securing said bed in position, upstanding rail means extending longitudinally along said bed, longitudinally extending overhang means on said rail means, a carriage body adjacent to said rail means, freely rotatable wheel means carried by said body in retained relation beneath said overhang means and mounting said body for free movement along said bed, upstanding swivel means on said body for connection to an animal tether, and an end member on each end of said carriage body extending at least partially across the adjacent wheels to substantially close the space between said bed, rail means and overhang means for effectively preventing the interference of foreign material with body movement.

2. An animal-run device according to claim 1, said anchoring means comprising ground-impaling elements.

3. An animal-run device according to claim 1, said overhang means being spaced over said bed, said wheel means being interposed between said overhang means and bed.

4. An animal-run device according to claim 3, said wheel means being rotatable about generally horizontal axes and rollably engageable with said bed and overhang means.

5. An animal-run device according to claim 3, said wheel means being rotatable about generally vertical axes and rollably engageable with said rail means.

6. An animal-run device according to claim 3, said wheel means comprising right and left wheels on opposite sides of said rail means.

7. An animal-run device according to claim 3, said rail means comprising a pair of laterally spaced upstanding rails, said overhang means comprising longitudinally extending inturned flanges on said rails, and said wheel means comprising a pair of wheels engaged beneath each flange.

References Cited by the Examiner

UNITED STATES PATENTS

| | | | |
|---|---|---|---|
| 623,596 | 4/89 | Covington | 119—120 |
| 1,377,800 | 5/21 | Brown | 198—121 |
| 1,846,021 | 2/32 | Bell | 198—177 X |
| 2,145,991 | 2/39 | Nichols | 119—120 X |
| 2,725,973 | 12/55 | King | 198—177 |
| 2,808,146 | 10/57 | Leach | 198—189 |
| 2,869,709 | 1/59 | Zebley | 198—177 |
| 2,941,657 | 6/60 | Newcomb et al. | 198—177 |
| 3,004,519 | 10/61 | Weissman | 119—120 X |
| 3,117,668 | 1/64 | Weihe et al. | 198—181 |

FOREIGN PATENTS 35,387  4/86  Germany.

SAMUEL KOREN, *Primary Examiner.*

ALDRICH F. MEDBERY, *Examiner.*